United States Patent [19]

Vinals et al.

[11] 4,083,373

[45] Apr. 11, 1978

[54] NOVEL TOBACCO PRODUCT COMPRISING ONE OR MORE SULFIDES AND PROCESS

[75] Inventors: Joaquin F. Vinals, Red Bank, N.J.; Jacob Kiwala, Brooklyn, N.Y.; William J. Evers, Red Bank; Howard H. Heinsohn, Jr., Hazlet, both of N.J.

[73] Assignee: International Flavors & Fragrances Inc., New York, N.Y.

[21] Appl. No.: 730,535

[22] Filed: Oct. 7, 1976

[51] Int. Cl.² ............................................. A24B 3/12
[52] U.S. Cl. ................................. 131/17 R; 131/144
[58] Field of Search ................. 131/17, 15, 2, 144; 260/593 R, 250 B

[56] References Cited

U.S. PATENT DOCUMENTS

| 3,911,018 | 10/1975 | Hall et al. | 131/17 R X |
| 3,917,876 | 11/1975 | Slangan | 131/17 R X |
| 3,940,499 | 2/1976 | Pittet et al. | 131/17 R X |

*Primary Examiner*—Robert W. Michell
*Assistant Examiner*—V. Millin
*Attorney, Agent, or Firm*—Arthur L. Liberman; Franklin D. Wolffe

[57] ABSTRACT

Described is a tobacco product having added thereto an amount sufficient to augment or enhance the flavor or aroma of the tobacco product particularly on smoking, of one or more sulfide compounds having the generic structure:

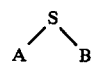

wherein, when A is:

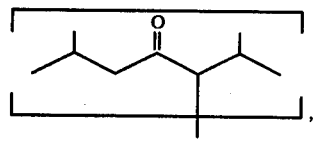

B is:

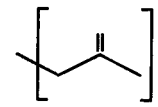

and when A is:

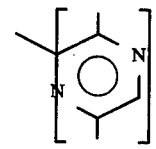

B is:

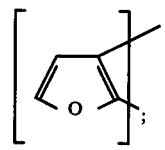

processes for producing such tobacco products and flavor formulations for use in conjunction with tobacco products containing one or more of such sulfide compounds.

10 Claims, No Drawings

NOVEL TOBACCO PRODUCT COMPRISING ONE OR MORE SULFIDES AND PROCESS

BACKGROUND OF THE INVENTION

This invention relates to novel tobacco products, novel tobacco flavoring compositions, and processes for producing same, and has for an object the provision of a composition and process for improving the flavor and aroma of tobacco and tobacco smoke.

It is well known in the tobacco art that the flavor and aroma of the tobacco product and the smoke flavor from the tobacco are very important considerations insofar as the ultimate consumer is concerned. Considerable efforts have been and are being exerted by the manufacturers of tobacco products to provide a product that will be acceptable to the consumer, particularly as regards tobacco smoke flavor and aroma characteristics. It has been the common practice in the tobacco industry to prepare blends of domestic and oriental tobaccos in order to provide smoking tobacco which has a pleasing flavor and aroma before and during smoking. However, such a procedure is costly and may at times become prohibitive in the event that certain types of tobacco may be in short supply. Accordingly, there has been considerable work relating to substances which can be used to impart flavors to various tobacco blends. These substances are used to supplement natural materials some of which, as stated above, may be in short supply, and to provide more uniform properties to the finished product.

Sweet, aromatic, hazelnut-like, fruity, grapefruit and-/or nut-like flavors, flavor nuances and aroma nuances are particularly desirable for many uses concerning the flavoring of tobacco products; both prior to and on smoking.

Due to their general meat-like aromas and flavors, compounds containing the mercapto or RS— groups have not been determined to have organoleptic properties causing them to be suitable for use in conjunction with tobacco flavors and aromas. It is thus quite surprising to find that the compounds of the instant invention are suitable for use in conjunction with tobacco flavors and aromas prior to and on smoking.

THE INVENTION

It has now been discovered that tobacco flavoring compositions and tobacco products having sweet, aromatic, hazelnut-like, fruity, grapefruit and/or nut-like flavors and aromas prior to and on smoking may be provided by adding to tobacco flavors and/or to tobaccos themselves one or more sulfide compounds having the generic structure:

wherein, when A is:

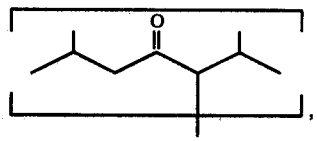

B is:

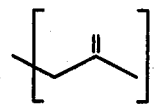

and when A is:

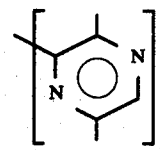

B is:

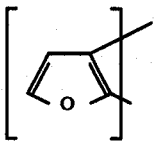

Specific examples of the compounds contemplated within the scope of our invention, and their tobacco flavor properties prior to and on smoking are as follows:

| COMPOUND NAME | COMPOUND STRUCTURE | ORGANOLEPTIC PROPERTIES PRIOR TO SMOKING | ORGANOLEPTIC PROPERTIES OF TOBACCO SMOKE FLAVOR |
|---|---|---|---|
| (3,6-dimethyl-2-pyrazinyl)(2-methyl-3-furyl)sulfide | | A sweet, nutty, hazelnut-like aroma | A sweeter, nutty, bready taste and aroma. |
| 3-(methallylthio)-2,6-dimethyl-4-heptanone | | A sweet, fruity, grapefruit-like aroma with green and spicey nuances | Sweeter, more body and less harsh, more aromatic in aroma and taste; with excellent sweet, fruity and grapefruit-like nuances |

It has been found that the tobacco additives of our invention when incorporated into tobacco products impart a flavor and aroma both before and during smoking which many smokers consider to be desirable in smoking products. However, it is pointed out that the methods for defining or characterizing the quality of a flavor or aroma in the tobacco art are almost purely subjective and different smokers may define the same flavor quite differently. Also as indicated in the above table, the compounds included within the scope of this invention may impart different flavors or aromas depending upon the substituents therein. Thus, the compounds comprehended by this invention, by subjective tests, impart characteristic flavors which are desirable in tobacco products and the smoke therefrom even though the exact character thereof cannot be described on the basis of known standards.

In accordance with this invention, one or more of the sulfides of our invention or mixtures thereof is added to tobacco or applied to a smoking article or its component parts in amounts of about 50-5,000 parts per million (ppm) based on dry weight of the tobacco product. Preferably the amount of additive is between about 100 and 500 ppm by weight in order to provide a tobacco product having a desired flavor and aroma. However, the amount used will depend upon the amount of flavor and aroma desired and the particular compound or mixture thereof that is used.

The additive may be incorporated at any step in the treatment of the tobacco, but is preferably added after aging, curing and shredding and before the tobacco is formed into cigarettes. Likewise it will be apparent that only a portion of the tobacco need be treated and the thus-treated tobacco may be blended with other tobaccos before the cigarettes or other smoking articles are formed. In such case the treated tobacco may have the additive in excess of the amounts above indicated so that when blended with other tobaccos, the final product will have the percentage within the indicated range.

In accordance with one specific embodiment of this invention an aged, flue-cured and shredded tobacco is sprayed with a 1% ethyl alcohol solution of (2-methyl-3-furyl) (3,6-dimethyl-2-pyrazinyl) sulfide in an amount to provide a tobacco containing 100 ppm by weight of the additive on a dry basis. Thereafter, the alcohol is removed by evaporation, and the tobacco is manufactured into cigarettes by the usual techniques. It has been found that the cigarette, when prepared as indicated, has a desired and pleasing flavor, an aroma which to some people is described as "nutty-bread/hazelnut" and is detectable and pleasing the main and side smoke streams when the cigarette is smoked.

The additives falling within the scope of this invention may be applied to the tobacco by spraying, dipping or otherwise, utilizing suitable suspensions or solutions of the additive. Thus, water or volatile organic solvents, such as alcohol, ether, acetone, volatile hydrocarbons and the like, may be used as the carrying medium for the additive while it is being applied to the tobacco. Also, other flavor and aroma producing additives, such as:

(a) Esters, for example:
Ethyl butyrate;
Ethyl acetate;
Ethyl valerate;
Amyl acetate;
Phenyl ethyl isovalerate; and
Methyl heptynyl carbonate;
(b) Aldehydes, for example:
3-phenyl-2-pentenal;
3-phenyl-3-pentenal;
phenyl acetaldehyde;
Cinnamaldehyde; and
Beta-ethyl-cinnamaldehyde;
(c) Ketones, for example:
Benzylidene acetone;
Acetophenone;
Maltol; and
Ethyl maltol;
(d) Acetals, for example:
3-phenyl-4-pentenal dimethyl acetal; and
3-phenyl-4-pentenal diethyl acetal (described in U.S. Pat. No 3,922,237 issued on Nov. 25, 1975);
(e) Natural oils and extracts, for example:
Vanilla;
Coffee extract;
Origanum Oil;
Cocoa extract;
Oil of cloves;
Nutmeg oil;
Celery seed oil;
Bergamot oil; and
Ylang-ylang oil
(f) Lactones, for example:
Delta-decalactone;
Delta-undecalactone;
Delta-dodecalactone;
Gamma-undecalactone; and
Coumarin;
(g) Ethers, for example:
Dibenzyl ether;
Vanillin; and
Eugenol;
(h) Pyrazines, for example:
2-Acetyl pyrazine;
2-Acetyl-6-methyl pyrazine;
2-Ethyl pyrazine;
2,3-Dimethyl pyrazine;
2,5-Dimethyl pyrazine; and
2-Ethyl-5-methyl pyrazine;
(i) Pyrroles, for example:
N-cyclopropyl pyrrole; and
N-cyclooctyl pyrrole;

as well as those additives disclosed in U.S. Pats. Nos. 2,766,145; 2,905,575; 2,905,576; 2,978,365; 3,041,211; 2,766,149; 2,766,150; 3,589,372; 3,288,146; 3,402,051 and 3,380,457 as well as Australian Patents Nos. 444,545; 444,507 and 444,389 may be incorporated into the tobacco with the additives of this invention.

While this invention is principally useful in the manufacture of cigarette tobacco, it is also suitable for use in connection with the manufacture of pipe tobacco, cigars or other tobacco products. Furthermore, the compounds may be added to certain tobacco substitutes of natural or synthetic origin and by the term "tobacco" as used throughout this specification is meant any composition intended for human consumption by smoking or otherwise, whether composed of tobacco plant parts or substituted materials or both (e.g., dried lettuce leaves and cabbage leaves).

Also, the invention has been particularly described with reference to the addition of the compounds directly to tobacco. However, it will be apparent that the compound may be applied to the paper of the cigarette or to the wrapper of a cigar. Also, it may be incorporated into the filter tip, the packaging material or the seam paste employed for gluing the cigarette paper. Thus, a tobacco product is provided which includes the specified additives and tobacco although in every instance the compound need not be admixed with the tobacco as above specifically described.

The 3-(methallylthio)-2,6-dimethyl-4-heptanone useful in our invention may be prepared according to the processes as described in Application for U.S. Pat. Ser. No. 730,538 filed on Oct. 7, 1977, now U.S. Pat. No. 4,045,491 issued on Aug. 30, 1977. The (2-methyl-3-furyl) (3,6-dimethyl-2-pyrazinyl)sulfide of our invention may be prepared according to Application for U.S. Pat. Ser. No. 581,962 filed on May 29, 1975, now U.S. Pat. No. 3,988,510 issued on Oct. 26, 1976.

The following examples are given to illustrate the embodiments of the invention as it is presently preferred to practice it. It will be understood that these examples are illustrative and the invention is not to be considered as restricted thereto except as indicated in the appended claims.

EXAMPLE I

PREPARATION OF (2-METHYL-3-FURYL) (3,6-DIMETHYL-2-PYRAZINYL)SULFIDE

Reaction:

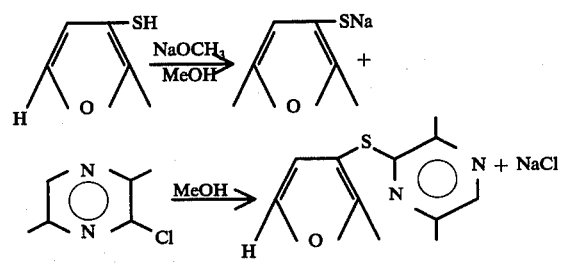

Into a 25 ml round bottom 3 neck flask equipped with magnetic stirrer, "Y" tube, nitrogen inlet, and reflux condenser with calcium chloride drying tube is added a solution of 0.27 g (0.005 moles) sodium methoxide in 3 ml absolute methanol. 0.57 g (0.005 moles) of 2-methyl-3-furan thiol dissolved in 3 ml absolute methanol is added slowly to the sodium methoxide solution with stirring while maintaining the reaction mass temperature at 22° – 25° C. The resulting yellow solution is permitted to stir for a period of 10 minutes. 0.71 g (0.005 moles) of 3-chloro-2,5-dimethyl-pyrazine dissolved in 1 ml absolute methanol is then added dropwise over a 2 minute period to the 2-methyl-3-furan thiol-sodium salt solution while maintaining the reaction mass temperature at 25° C. The temperature of the reaction mass is then raised to reflux (63° C) under nitrogen and refluxing is continued for a period of 5 hours.

At the end of this 5 hour period, the reaction mass is cooled down to 25° C and 10 ml of water is added with stirring. The pH of the reaction mass is lowered to a pH of 6 using 4% hydrochloric acid. 10 ml of n-hexane is added to the reaction mass causing there to be an organic phase and an aqueous phase. The aqueous phase is separated and extracted with 10 ml of hexane. The two hexane solutions are combined and washed with saturated sodium chloride solution and dried over anhydrous sodium sulfate. The dried material is then concentrated yielding 0.58 g of a crude oil. IR, NMR and Mass Spectral analyses confirm that the structure of the major material in this crude oil, isolated by GLC trapping, is:

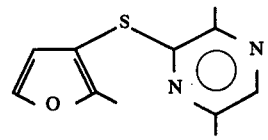

(GLC conditions: 8 feet × ¼ inch SE-30 column).

This material has a sweet, meaty, roasted aroma and a sweet, meaty rubbery flavor with metallic and bloody nuances. NMR analysis is as follows:

| SIGNAL | | INTERPRETATION | |
|---|---|---|---|
| 2.34 ppm | (s) | CH$_3$—of furan | ⎫ 6 H |
| 2.36 | (s) | CH$_3$ of pyrazine | ⎬ |
| 2.56 | (s) | CH$_3$ of pyrazine | ⎭ 3 H |
| 6.42 | (d) | H$_4$ of furan | 1 H |
| 7.38 | (d) | H$_5$ of furan | 1 H |
| 8.00 | (s) | Pyrazine proton | 1 H |

IR analysis is as follows:
440, 725, 880, 940, 960, 1080, 1130, 1170, 1230, 1240, 1310, 1330, 1370, 1380, 1435, 1510, 1550, 2920 cm$^{-1}$.

Mass Spectral analysis is as follows:

| m/e | Relative Intensity |
|---|---|
| 39 | 47[3] |
| 42 | 43[5] |
| 43 | 21 |
| 80 | 22 |
| 81 | 47[4] |
| 107 | 20 |
| 191 | 27 |
| 192 | 34[6] |
| 203 | 56[2] |
| M220 | 100[1] |

EXAMPLE II

PREPARATION OF 3-METHALLYLTHIO-2,6-DIMETHYL-4-HEPTANONE (A) Preparation of 3-chloro-2,6-dimethyl-4-heptanone Reaction:

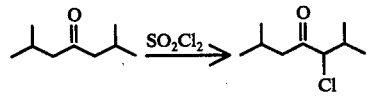

Into a one-liter, three-necked, round bottom flask equipped with "Y" tube, pot thermometer, mechanical stirrer, 125 ml addition funnel, gas outlet tube, cold water bath and water aspirator vacuum is added 356 grams of 2,6-dimethyl-4-heptanone (2.4 moles). Over a period of one hour, 67.5 grams (40 ml; 0.5 moles) of SO$_2$Cl$_2$ is slowly added to the ketone with stirring while maintaining the reaction mass temperature in the range of 23°–35° C.

The reaction mass is then evacuated slowly using water aspirator vacuum thereby removing most of the acidic gases resulting from the foregoing reaction.

The reaction mass is then transferred to a one-necked, one-liter, round-bottom flask and the last traces of acidic gases are removed thus yielding 371 grams of product. The reaction mass is then transferred to a 500 ml, three-necked, round-bottom flask equipped with a 2.0 × 30 cm distillation column packed with ⅜ inch helices, reflux head, magnetic stirrer, heating mantle and vacuum pump, and the resulting 3-chloro-2,6-dimethyl-4-heptanone is fractionally distilled at a vapor temperature of 106°–107° C and a pressure of 45–46 mm Hg yielding a product of 97% purity as confirmed by GLC, mass spectral, NMR and IR analyses.

B. Preparation of 3-mercapto-2,6-dimethyl-4-heptanone

Reaction:

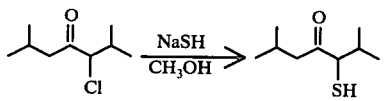

Into a 250 ml, round bottom, three-necked flask equipped with magnetic stirrer, pot thermometer, 6 inch Vigreux distillation column with gas outlet at top leading over 200 ml 10% sodium hydroxide solution H₂S gas inlet tube (sub-surface), "Y" tube, 50 ml addition funnel, gas bubbler, and dry ice-isopropyl alcohol bath, and cold water bath is added a solution of 11.6 grams of sodium methoxide dissolved in 90 ml anhydrous methanol. The sodium methoxide solution is cooled to a temperature of −15° C using the dry ice-isopropanol bath. While maintaining the temperature of the sodium methoxide solution at −10° to −5° C, hydrogen sulfide is bubbled into the reaction mass over a period of 2 hours. While continuing to bubble in hydrogen sulfide and maintaining the reaction mass at a temperature in the range of −5° to −9° C, the 3-chloro-2,6-dimethyl-4-heptanone prepared in Part A of this example (18.2 grams; 0.100 moles) is added slowly to the reaction mass from the addition funnel over a period of 13 minutes. The reaction mass is then maintained at a temperature of 0°–26° C for a period of 4 hours (25°–26° C for the last 1.5 hours).

The reaction mass is then concentrated to approximately 25 ml (thick slurry) using a rotary evaporator and water aspirator vacuum. 85 ml distilled water is then added to the reaction mass, with stirring, while maintaining the temperature at 25° C, thereby yielding a turbid yellow solution. 85 grams of 10% aqueous sodium hydroxide is then added to the resulting mixture whereupon the temperature rises from 25° to 28° C (pH = 10-11). The basic aqueous solution is then extracted with two 70 ml portions of methylene chloride and the extracts are combined, dried and concentrated yielding 1.7 grams of an oil. The basic aqueous solution is then acidified with 115 ml 10% hydrochloric acid to a pH of 1-2. This is then extracted with four 50 ml portions of methylene chloride. The methylene chloride extracts are combined and washed with two 35 ml portions of saturated sodium chloride (to a pH of 5) and dried over anhydrous sodium sulfate. The resulting mixture is gravity filtered and concentrated on a rotary evaporator to yield 15.5 grams of product containing 96.1% 3-mercapto-2,6-dimethyl-4-heptanone as confirmed by mass spectral, NMR and IR analyses. This material is vacuum distilled at a vapor temperature of 77.5°–78° C and a pressure of 6 mm Hg.

C. Preparation of 3-methallylthio-2,6-dimethyl-4-heptanone

Reaction:

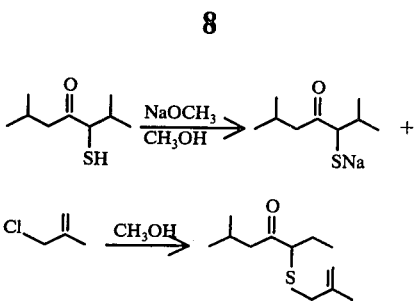

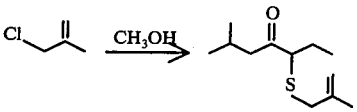

Into a 25 ml, three-necked, round bottom flask equipped with magnetic stirrer, "Y" tube, nitrogen inlet, reflux condenser with cotton plug, cold water bath and warm water bath is added a solution of 0.162 grams of sodium methoxide dissolved in 2 ml anhydrous methanol. Over a period of 1 minute is added a solution of 0.522 grams of 3-mercapto-2,6-dimethyl-4-heptanone dissolved in 3 ml anhydrous methanol, with stirring. After stirring 12 minutes at 24°–25° C, a solution of 0.3 grams of 3-chloro-2-methylpropene in 1 ml anhydrous methanol is added. With a water bath, the resulting reaction mass is warmed to 31° C and the reaction mass is then stirred while maintaining the temperature in the range of 23°–30° C for a period of 2 hours.

The reaction mass is then concentrated on a rotary evaporator using water aspirator vacuum to approximately 4 ml yielding a slurry. To the slurry is added 8 ml water and the solid dissolves. The reaction mass is then acidified to a pH of 1-2 with 3 drops of 10% hydrochloric acid. The reaction mass is then extracted with three 8 ml portions of methylene chloride and the extracts are combined, washed with 10 ml water, dried over anhydrous sodium sulfate and gravity filtered. The extracts are concentrated on a rotary evaporator to yield 0.54 grams of a white oil containing 93.6% by GLC of 3-methallylthio-2,6-dimethyl-4-heptanone as confirmed by MS, IR and NMR analyses of trapped product.

The mass spectral analysis is as follows:

| (m/e) | Relative Intensity |
| --- | --- |
| 41 | 29 |
| 55 | 44[3] |
| 57 | 37[6] |
| 69 | 10 |
| 85 | 43[5] |
| 87 | 93[2] |
| 109 | 33 |
| 142 | 44[4] |
| 143 | 100[1] |
| M 228 | 28 |

The NMR analysis is as follows:

| | | | |
| --- | --- | --- | --- |
| 1.92 ppm, 2.06 | (2 doublets) | H<br>\|<br>CH₃—C— | 12H |
| 1.78 | (s) | =C—CH₃ | 3H |
| 2.12 | (m) | methine protons | 2H |
| 2.47 | (t) | —CH₂— | 2H |
| 2.82 | (d) | O=C—C—S—<br>\|<br>H | 1H |
| 3.01 | (s) | =C—CH₂—S— | 2H |
| 4.86 | (s) | H<br>\ /<br>C=C<br>/ \<br>H | 2H |

The IR analysis is as follows:

890 cm$^{-1}$, 1035, 1160, 1200, 1225, 1285, 1360, 1380, 1400, 1460, 1640, 1695, 2870, 2960, 3080.

Material prepared similarly to above example was vacuum distilled yielding 99.8% pure product (boiling point 100°–100.5° C at 1.3 mm Hg). The thus-distilled material has the same physical properties as set forth above for 3-methallylthio-2,6-dimethyl-4-heptanone.

EXAMPLE III

TOBACCO USE OF (3,6-DIMETHYL-2-PYRAZINYL) (2-METHYL-3-FURYL)SULFIDE

The following tobacco flavor Formulation (A) is prepared:

| Ingredients | Parts |
| --- | --- |
| Ethyl Butyrate | 0.05 |
| Ethyl Valerate | 0.05 |
| Maltol 2.00 | |
| Cocoa Extract | 26.00 |
| Coffee Extract | 10.00 |
| Ethanol (95% aqueous) | 20.00 |
| Water | 41.90 |

The following tobacco blend Formulation (B) is prepared:

| Ingredients | Parts |
| --- | --- |
| Bright Tobacco | 40.1 |
| Burley Tobacco | 24.9 |
| Maryland Tobacco | 1.1 |
| Turkish Tobacco | 11.6 |
| Stem (Flue-cured) Tobacco | 14.2 |
| Glycerine | 2.8 |
| Water | 5.3 |

The flavor formulation (A) is added to a portion of the smoking tobacco formulation (B) at the rate of 0.1% by weight of the tobacco. The flavored and non-flavored tobacco formulations are then formulated into cigarettes by the usual manufacturing procedure:

At the rate of 100 ppm to half of the cigarettes in each group is added (3,6-dimethyl-2-pyrazinyl) (2-methyl-3-furyl)sulfide. The use of the (3,6-dimethyl-2-pyrazinyl) (2-methyl-3-furyl)sulfide in the cigarettes causes the cigarettes, prior to smoking, to have a sweet, nutty-hazelnut-like aroma. In smoke flavor, these notes are still found and the tobacco aroma on smoking is sweeter, nutty, and has a slightly bready nuance, whether or not the other flavor ingredients of formulation (A) are present.

EXAMPLE IV

TOBACCO USE OF 3-(METHALLYLTHIO)-2,6-DIMETHYL-4-HEPTANONE

The following tobacco flavor formulation (A) is prepared:

| Ingredients | Parts |
| --- | --- |
| Ethyl Butyrate | 0.05 |
| Ethyl Valerate | 0.05 |
| Maltol 2.00 | |
| Cocoa Extract | 26.00 |
| Coffee Extract | 10.00 |
| Ethanol (95% aqueous) | 20.00 |
| Water | 41.90 |

The following tobacco blend Formulation (B) is prepared:

| Ingredients | Parts |
| --- | --- |
| Bright Tobacco | 40.1 |
| Burley Tobacco | 24.9 |
| Maryland Tobacco | 1.1 |
| Turkish Tobacco | 11.6 |
| Stem (Flue-cured) Tobacco | 14.2 |
| Glycerine | 2.8 |
| Water | 5.3 |

The flavor formulation (A) is added to a portion of the smoking tobacco formulation (B) at the rate of 0.1% by weight of the tobacco. The flavored and non-flavored tobacco formulations are then formulated into cigarettes by the usual manufacturing procedure:

At the rate of 100 parts per million, to one-half of the cigarettes in each group, is added 3-(methallylthio)-2,6-dimethyl-4-heptanone. The use of the 3-(methallylthio)-2,6-dimethyl-4-heptanone in the cigarettes causes the cigarettes prior to smoking to have a sweet, fruity, grapefruit aroma with green and spicey nuances. In smoke flavor, the tobacco has a sweeter, less harsh and more aromatic aroma with more body, and sweet, fruity, grapefruit-like nuances which are highly desirable. These notes are present whether or not the other flavor ingredients of formulation (A) are present.

It will be understood by those skilled in the art from the foregoing description, that the sulfide compounds of our invention can be used in the preparation of a wide variety of tobacco flavors and products.

EXAMPLE V

TOBACCO FLAVOR FORMULATION CONTAINING 3-(METHALLYLTHIO)-2,6-DIMETHYL-4-HEPTANONE

A tobacco flavor formulation is prepared by admixing the following ingredients:

| Ingredients | Parts |
| --- | --- |
| 3-(methallylthio)-2,6-dimethyl-4-heptanone | 2.0 |
| Ethyl butyrate | 0.5 |
| Ethyl Valerate | 0.5 |
| Maltol | 20.0 |
| Cocoa Extract | 260.0 |
| Coffee Extract | 100.0 |
| 95% Aqueous Ethanol | 200.0 |
| Water | 419.0 |

This formulation is added to smoking tobacco at the rates of 0.01%, 0.02%, 0.03% and 0.035% based on the dry weight of the tobacco. The tobacco is then manufactured into cigarettes according to standard manufacturing practice. On smoking the cigarettes, the aroma and taste is described as "sweet, fruity, grapefruit-like," the tobacco itself on smoking being sweeter, less harsh, more aromatic and having more body.

EXAMPLE VI

TOBACCO FLAVOR FORMULATION

A tobacco flavoring formulation is prepared by admixing the following ingredients:

| Ingredients | Parts |
| --- | --- |
| Bergamot Oil, Italy | 5.00 |
| Ylang-ylang oil | 1.20 |
| (3,6-dimethyl-2-pyrazinyl)(2-methyl-3-furyl)sulfide | 1.20 |
| Acetophenone | 1.20 |
| Phenyl acetaldehyde | 0.50 |
| Phenyl ethyl isovalerate | 1.00 |
| Methyl heptynyl carbonate | 0.50 |
| 3-Phenyl-4-pentenal diethyl acetal prepared according to the process disclosed in U.S. Patent 3,922,237 issued on November 25, 1975 | 20.00 |
| 95% Aqueous Ethanol | 69.40 |

The foregoing flavor is added to smoking tobacco at the rates of 0.10%, 0.20% and 0.30% based on the weight of dry tobacco. The tobacco is then manufactured into cigarettes according to standard manufacturing practice. The purpose of the 3-phenyl-4-pentenal diethyl acetal is to cause the tobacco on smoking to have a hay, clover-like flavor with fruity notes. The (3,6-dimethyl-2-pyrazinyl) (2-methyl-3-furyl)sulfide (at concentrations, based on the dry weight of tobacco, of 200 ppm) acts as an excellent replacement for the Coumarin, previously used in this formulation.

What is claimed is:

1. A smoking tobacco product having added thereto an amount sufficient to augment or enhance the flavor or aroma of the tobacco product of one or more sulfide compounds having the formula:

wherein, when A is:

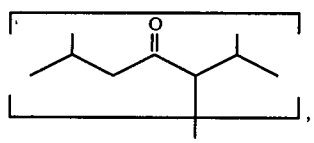

B is:

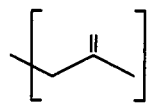

and when A is:

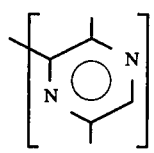

B is:

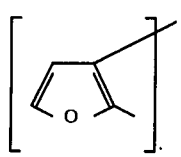

2. The smoking tobacco product of claim 1, wherein the sulfide is 3-(methallylthio)-2,6-dimethyl-4-heptanone having the structure:

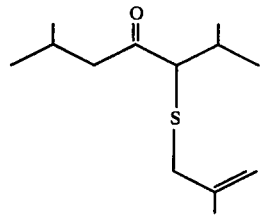

3. The smoking tobacco product of claim 1, wherein the sulfide compound is (3,6-dimethyl-2-pyrazinyl) (2-methyl-3-furyl)sulfide having the structure:

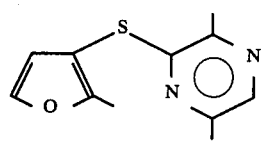

4. The smoking tobacco product of claim 1, wherein the concentration of sulfide in the tobacco product is from 50 up to 5,000 parts per million based on the total weight of tobacco on a dry basis.

5. The smoking tobacco product of claim 1, wherein the concentration of sulfide in the tobacco product is from 100 up to 500 parts per million based on the total weight of tobacco on a dry basis.

6. A process for augmenting or enhancing the aroma or taste of a smoking tobacco comprising adding to smoking tobacco in an amount sufficient to augment or enhance the flavor or aroma of said smoking tobacco of one or more sulfide compounds having the formula:

wherein, when A is:

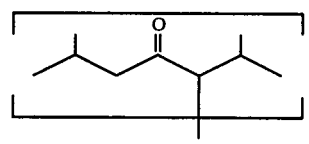

B is:

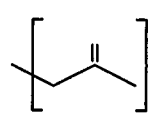

and when A is:

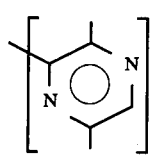

B is:

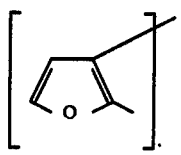

7. The process of claim 6 wherein the sulfide is 3-(methallylthio)-2,6-dimethyl-4-heptanone having the structure:

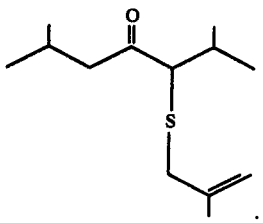

8. The process of claim 6 wherein the sulfide compound is (3,6-dimethyl-2-pyrazinyl) (2-methyl-3-furyl)-sulfide having the structure:

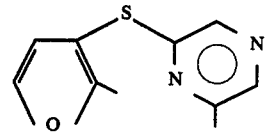

9. The process of claim 6 wherein the concentration of sulfide added to the smoking tobacco is from 50 up to 5,000 parts per million based on the total weight of tobacco on a dry basis.

10. The process of claim 6 wherein the concentration of sulfide added to the smoking tobacco is from 100 up to 500 parts per million based on the total weight of tobacco on a dry basis.

* * * * *